US012247427B2

(12) United States Patent
Thomas et al.

(10) Patent No.: US 12,247,427 B2
(45) Date of Patent: Mar. 11, 2025

(54) HINGE, HINGE SYSTEM AND METHOD OF HINGING

(71) Applicant: The Big Green Egg, Inc., Atlanta, GA (US)

(72) Inventors: Jon Thomas, Peachtree Corners, GA (US); Austin Bush, Peachtree Corners, GA (US); George Fleck, Atlanta, GA (US); Joe Boeckel, Atlanta, GA (US)

( * ) Notice: Subject to any disclaimer, the term of this patent is extended or adjusted under 35 U.S.C. 154(b) by 0 days.

(21) Appl. No.: 18/092,894

(22) Filed: Jan. 3, 2023

(65) Prior Publication Data

US 2024/0218718 A1 Jul. 4, 2024

(51) Int. Cl.
*E05D 11/06* (2006.01)
*E05D 3/02* (2006.01)
(Continued)

(52) U.S. Cl.
CPC ................. *E05D 3/18* (2013.01); *E05D 3/02* (2013.01); *E05F 1/12* (2013.01); *E05Y 2999/00* (2024.05)

(58) Field of Classification Search
CPC .... E05D 3/02; E05D 3/06; E05D 3/12; E05D 3/14; E05D 3/142; E05D 3/16; E05D 3/125; E05D 3/127; E05D 3/18; E05D 3/185; E05D 3/186; E05D 7/04; E05D 7/0423; E05D 7/0415; E05D 7/043; E05D 7/0027; E05D 7/0045; E05D 5/02; E05D 5/062; E05D 11/08; E05D 11/00; E05D 11/06; E05D 11/1014; E05D 11/1007; E05D 2007/0438; E05D 2007/0446; E05D 2007/0453; E05D 2007/0461; E05D 2007/0469; E05D 2007/0476;
(Continued)

(56) References Cited

U.S. PATENT DOCUMENTS 2,666,946 A * 1/1954 Miller .................. A47J 37/0611
16/361
2,701,840 A * 2/1955 Carlson ..................... F21S 8/04
220/815
(Continued)

FOREIGN PATENT DOCUMENTS

AU 2020245900 A1 9/2022
CN 208236191 U * 12/2018
(Continued)

OTHER PUBLICATIONS

Burn Shop Large BBQ Smoker Hinge, amazon.com, last accessed May 11, 2022.
(Continued)

*Primary Examiner* — Chuck Y Mah
(74) *Attorney, Agent, or Firm* — The Sladkus Law Group

(57) ABSTRACT

A hinge for rotating a first object relative to a fixed second object. The hinge has left and right upper rear brackets coupled to a lower edge of the first object at the rear of the first object. Each of the left and right upper rear brackets has a pin coupled thereto. The hinge also has left and right lower rear brackets coupled to an upper edge of the second object at the rear of the second object. An arcuate slot is defined in a portion of the left and right lower rear brackets. The slot is sized and shaped such that at least a portion of the pin can be positioned in and can slidingly move through the slot.

20 Claims, 12 Drawing Sheets

(51) Int. Cl.
*E05D 3/18* (2006.01)
*E05F 1/12* (2006.01)

(58) Field of Classification Search
CPC .... E05D 2007/0484; E05D 2007/0492; E05D 2007/10; E05Y 2600/41; E05Y 2600/634; E05Y 2600/412; E05Y 2600/45; E05Y 2600/452; E05Y 2600/46; E05Y 2900/132; E05Y 2900/20; E05Y 2900/50; E05Y 2900/531; E05Y 2900/546; E05Y 2900/60; E05Y 2900/606; E05Y 2201/638; E05Y 2201/712; E05F 1/12
See application file for complete search history.

(56) References Cited

U.S. PATENT DOCUMENTS

| | | | | |
|---|---|---|---|---|
| 2,732,580 | A | 1/1956 | Schwaneke | |
| 2,748,690 | A * | 6/1956 | Lipsich | A47J 37/0611 99/450 |
| 2,850,760 | A * | 9/1958 | Vanderwalker | B65F 1/1646 220/817 |
| 3,113,339 | A * | 12/1963 | Krause | E05D 3/06 16/303 |
| 3,320,944 | A * | 5/1967 | Hoppe | F24C 3/12 126/214 B |
| 3,605,718 | A | 9/1971 | Winters | |
| 3,682,348 | A * | 8/1972 | Roberts | A47J 37/0611 16/361 |
| 3,714,937 | A | 2/1973 | Linstead | |
| 3,734,076 | A | 5/1973 | Kiziol | |
| 3,881,221 | A * | 5/1975 | Schmidt | E05D 3/186 16/361 |
| 4,584,589 | A * | 4/1986 | Bivins | H01Q 1/088 343/882 |
| 4,649,599 | A | 3/1987 | Beller | |
| 4,862,979 | A * | 9/1989 | Borchard | G01G 21/30 220/815 |
| 4,953,259 | A * | 9/1990 | Frye | B60N 2/847 16/337 |
| 5,111,802 | A | 5/1992 | Lin | |
| 5,116,099 | A * | 5/1992 | Kwasnik | B60N 2/75 297/411.32 |
| 5,165,385 | A | 11/1992 | Doolittle | |
| 5,355,558 | A | 10/1994 | Vertanen | |
| 5,394,590 | A | 3/1995 | Yu | |
| 5,465,557 | A * | 11/1995 | Harte | E05F 1/1091 16/361 |
| 5,606,905 | A | 3/1997 | Boehm | |
| 5,960,784 | A | 10/1999 | Ryan | |
| 6,073,623 | A | 6/2000 | Maschhoff | |
| 6,276,263 | B1 | 8/2001 | Huang | |
| 6,463,923 | B2 * | 10/2002 | Carley | E05C 17/025 126/41 R |
| 6,701,577 | B1 | 3/2004 | Yeh | |
| D507,957 | S | 8/2005 | Nipke | |
| 6,948,758 | B2 * | 9/2005 | Henderson | E05D 3/022 296/100.06 |
| 7,770,576 | B2 | 8/2010 | Polkinghorn | |
| 8,303,059 | B2 | 11/2012 | Darney | |
| 9,896,869 | B2 | 2/2018 | Chung | |
| 10,519,703 | B1 | 12/2019 | Albrecht | |
| 10,531,765 | B2 * | 1/2020 | Boyd, Sr. | A47J 36/02 |
| 10,633,904 | B2 | 4/2020 | Elkasevic | |
| 10,874,252 | B2 | 12/2020 | Colston | |
| 10,954,705 | B2 | 3/2021 | Ma | |
| 11,147,417 | B2 | 10/2021 | Feng | |
| 11,291,334 | B2 | 4/2022 | Bahreinian | |
| 11,384,578 | B2 | 7/2022 | Lee | |
| 11,510,524 | B2 | 11/2022 | Pruitt | |
| 11,659,951 | B2 | 5/2023 | Qin | |
| 2002/0104191 | A1 * | 8/2002 | Matteau | E05D 3/18 16/255 |
| 2005/0081721 | A1 | 4/2005 | Craycraft | |
| 2013/0319258 | A1 * | 12/2013 | Cleveland | A47J 37/049 99/421 R |
| 2020/0281405 | A1 * | 9/2020 | Feng | A47J 37/0786 |
| 2022/0167636 | A1 | 6/2022 | Masek | |

FOREIGN PATENT DOCUMENTS

| | | | |
|---|---|---|---|
| CN | 217429817 | U | 9/2022 |
| CN | 217959661 | U | 12/2022 |
| CN | 219088963 | U | 5/2023 |
| CN | 219126046 | U | 6/2023 |
| DE | 102019135701 | A1 | 6/2020 |
| WO | 2023040855 | A1 | 3/2023 |

OTHER PUBLICATIONS

BBQ Smoker Hinge—DIY BBQ Smoker Hinges, americanaftermarketsmetalworks.com, last accessed May 11, 2022.
3 Inch Bullet Weld-On Smoker Door Hinge, bbqsmokersupply.com, last accessed May 11, 2022.

* cited by examiner

HINGE, HINGE SYSTEM AND METHOD OF HINGING

FIELD OF THE INVENTION

The present invention relates generally to hinges for rotatably coupling a first object to a stationary second object. More specifically, the present invention relates generally to hinge devices, systems and methods that allow a first object to rotate relative to a fixed second object.

BACKGROUND OF THE INVENTION

Many common items and devices include a first portion rotatably coupled to a fixed second portion. For example, conventional barbeque grills comprise a fixed lower tub having an open upper end and a lid configured to matingly engage the open upper end to form an enclosed inner tub volume. In use, the lid must be selectively movable about and between a first position, in which the lid is matingly engaged with the open upper end to form the enclosed inner tub volume, and a second position in which the lid is repositioned or removed to allow a user access to the inner tub volume.

In order to easily reposition or remove the lid to allow a user access to the inner tub volume, it is convenient to attach the lid to the tub with a hinge and the like that permits access to the inner tub volume by rotating the lid away from the tub. If the lid, however, is relatively heavy then conventional hinge structures can be ineffective and/or dangerous to use. For example, an unassisted hinge can require the user to exert too much force to safely lift the lid, especially when working near very hot surfaces. In another example, a conventional assisted hinge, such as a spring assisted hinge, can prevent the lid from mating properly with the tub.

Accordingly, it is desirable to provide hinge devices, systems and methods for rotatably coupling a first object to a stationary second object such that the first object can be safely rotated about and between the first position and the second position.

SUMMARY

Presented herein is a hinge, hinge system and method of hinging for rotating a first object relative to a fixed second object. The first object can have a lower edge configured to matingly engage an upper edge of the second object. The first object and the second object have a front side and an opposed rear side.

The hinge comprises left and right upper rear brackets coupled to the lower edge of the first object at the rear of the first object. Each of the left and right upper rear brackets can comprise a proximal upper flange portion and an opposed distal upper portion, the distal upper portion extending rearward from the first object. A pin can be coupled to or formed integrally with the distal upper portion.

The hinge further comprises left and right lower rear brackets coupled to the upper edge of the second object at the rear of the second object. Each of the left and right lower rear brackets can comprise a proximal lower flange portion, an opposed distal lower portion and a central portion positioned between the proximal lower flange portion and the distal lower portion. An arcuate slot can be defined in a portion of the left and right lower rear brackets such that the slot can have a first slot end defined in the central portion and a second slot end defined in the distal lower portion. The slot can be sized and shaped such that at least a portion of the pin can be positioned in and can slidingly move therethrough the slot.

In use, the first object can be rotatable about and between a first closed position, in which the lower edge of the first object engages the upper edge of the second object, and a second open position, in which the front of the first object is spaced from the second object a predetermined open distance.

Also presented herein is a method for rotating a first object relative to a fixed second object, wherein the first object has a lower edge configured to matingly engage an upper edge of the second object, and wherein the first object and the second object have a front side and an opposed rear side.

The method comprises providing a hinge comprising left and right upper rear brackets coupled to the lower edge of the first object at the rear of the first object. Each of the left and right upper rear brackets can have a proximal upper flange portion and an opposed distal upper portion such that the distal upper portion extends rearward from the first object.

The hinge further comprises left and right lower rear brackets coupled to the upper edge of the second object at the rear of the second object. Each of the left and right lower rear brackets can have a proximal lower flange portion, an opposed distal lower portion and a central portion between the proximal lower flange portion and the distal lower portion. An arcuate can be defined in a portion of the left and right lower rear brackets.

The hinge further comprises a pin coupled to the distal upper portion, and the slot can be sized and shaped such that at least a portion of the pin can be positioned in and can slidingly move therethrough the slot.

The method further comprises urging the first object about and between a first closed position, in which the lower edge of the first object engages the upper edge of the second object, and a second open position, in which the front of the first object is spaced from the second object a predetermined open distance.

Related methods of operation are also provided. Other apparatuses, methods, systems, features, and advantages of the hinge for rotating a first object relative to a fixed second object will be or become apparent to one with skill in the art upon examination of the following figures and detailed description. It is intended that all such additional apparatuses, methods, systems, features, and advantages be included within this description, be within the scope of the hinge for rotating a first object relative to a fixed second object and be protected by the accompanying claims.

DESCRIPTION OF THE INVENTION

The present invention can be understood more readily by reference to the following detailed description, examples, and claims, and their previous and following description. Before the present system, devices, and/or methods are disclosed and described, it is to be understood that this invention is not limited to the specific systems, devices, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known aspect. Those skilled in the relevant art will recognize that many changes can be made to the aspects described, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used herein, the singular forms “a,” “an” and “the” include plural referents unless the context clearly dictates otherwise. Thus, for example, reference to an “element” includes aspects having two or more such elements unless the context clearly indicates otherwise.

Ranges can be expressed herein as from “about” one particular value, and/or to “about” another particular value. When such a range is expressed, another aspect includes from the one particular value and/or to the other particular value. Similarly, when values are expressed as approximations, by use of the antecedent “about.” it will be understood that the particular value forms another aspect. It will be further understood that the endpoints of each of the ranges are significant both in relation to the other endpoint and independently of the other endpoint.

As used herein, the terms “optional” or “optionally” mean that the subsequently described event or circumstance may or may not occur, and that the description includes instances where said event or circumstance occurs and instances where it does not.

The hinge device that allows a first object to rotate relative to a fixed second object is shown in FIGS. 1-9. Note that while reference will be made herein to the use of the hinge device 10 with a grill 12, is contemplated that the hinge device 10 is not limited to such application and can be used with many other applications in which it is desirable for a first object 14 to rotate relative to a fixed second object 16.

Figure 1:
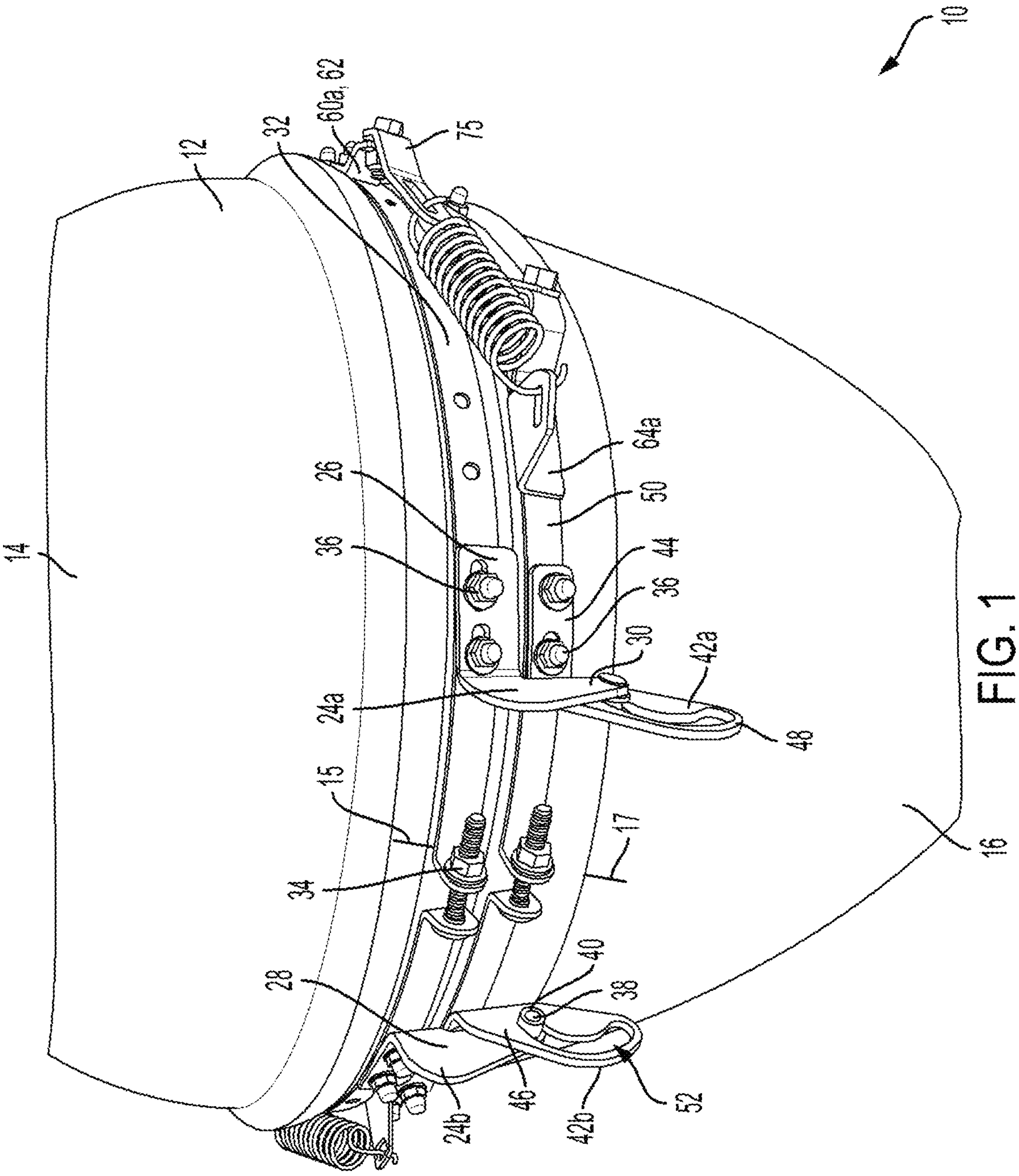
FIG. 1 is a rear perspective view of a hinge for rotating a first object relative to a fixed second object record, according to one aspect, in which the hinge comprises a plurality of brackets.
Figure 8:
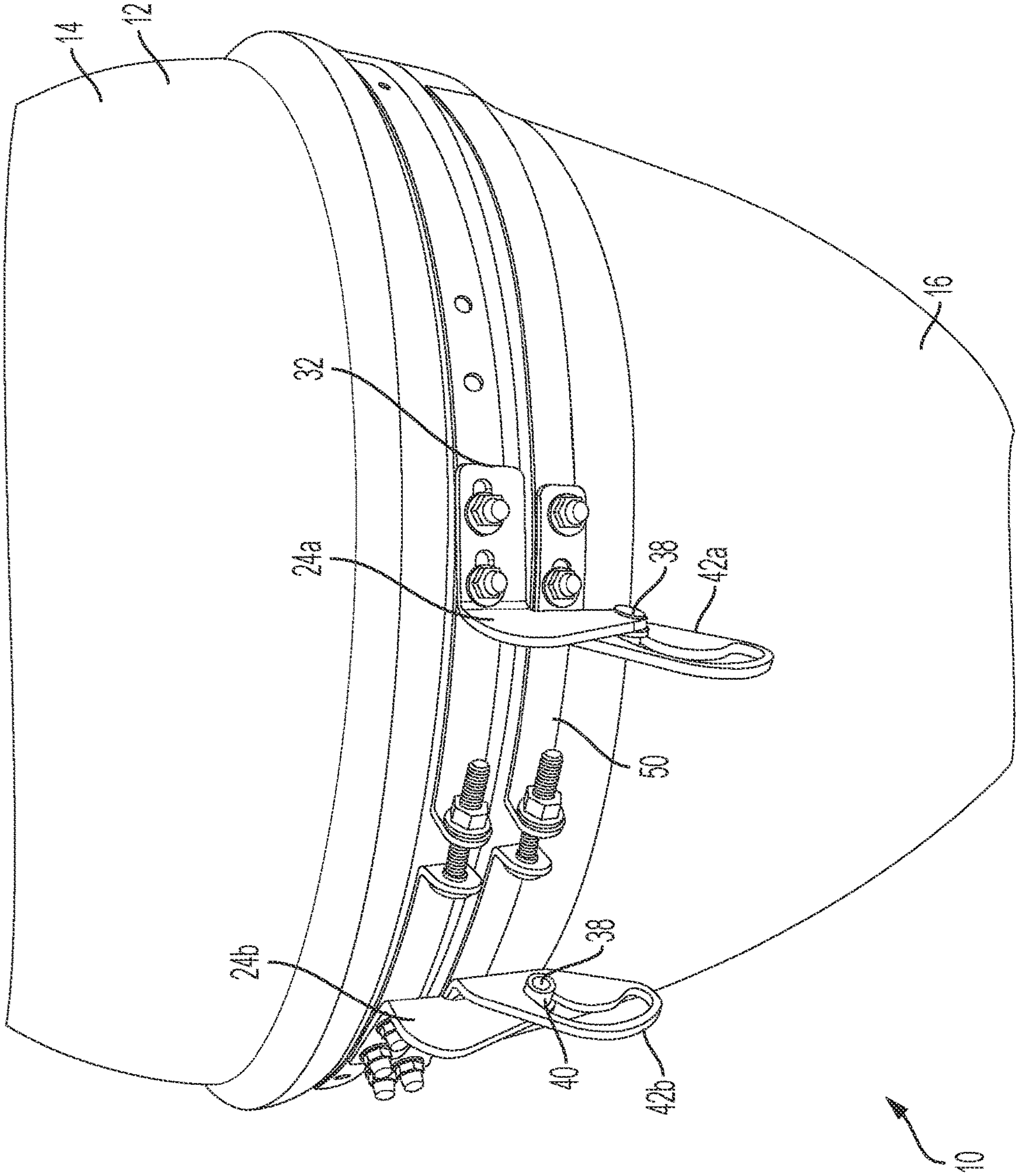
FIG. 8 is a rear perspective view of a hinge for rotating a first object relative to a fixed second object record according to another aspect, in which the plurality of brackets comprises only left and right upper brackets and left and right lower brackets, and showing the first object in a closed position.

Referring now to FIGS. 1 and 8, for example, the first object 14 can be a lid of the grill 12 and the fixed second object 16 can be a lower tub of the grill 12. The second object 16 can having an upper edge 18 around an open upper end. The second object 16 can define an interior chamber 20 having a predetermined tub volume. The first object 14 can have a lower edge 22 sized and shaped such that the lower edge 22 of the first object 14 can matingly engage the upper edge 18 of the second object 16 to enclose the interior chamber 20 when the first object 16 is in a closed position. Optionally, a sealing gasket can be positioned on at least one of the upper edge 18 of the second object 16 and the lower edge 22 of the first object 14 to form a seal between the second object 16 and the first object 14 when the first object 14 is in the closed position.

For reference throughout this application, the “front” of the first object 14 and/or the second object 16 can have a handle or other opening device, and the “rear” of the first object 14 and the second object 16 can be the opposed side from the front. For example, FIG. 1 shows the rear of the first object 14 and the second object 16. The “left side” and the “right side” of the first object 14 and the second object 16 can extend between the front and the rear.

The hinge device 10 comprises a plurality of brackets configured to rotatably couple the first object 14 to the second object 16. In one aspect, the plurality of brackets comprises left and right upper rear brackets 24*a, b* coupled to the lower edge 22 of the first object 14 on the outside and at the rear of the first object 14. The left and right upper rear brackets 24*a,b* can each have a proximal flange portion 26, a central portion 28 that extends rearward and downward from the first object 14 to a distal end portion 30. The distal end portion 30 of the left and right upper rear brackets 24*a, b* can extend below the upper edge 18 of the second object 16.

Figure 4:
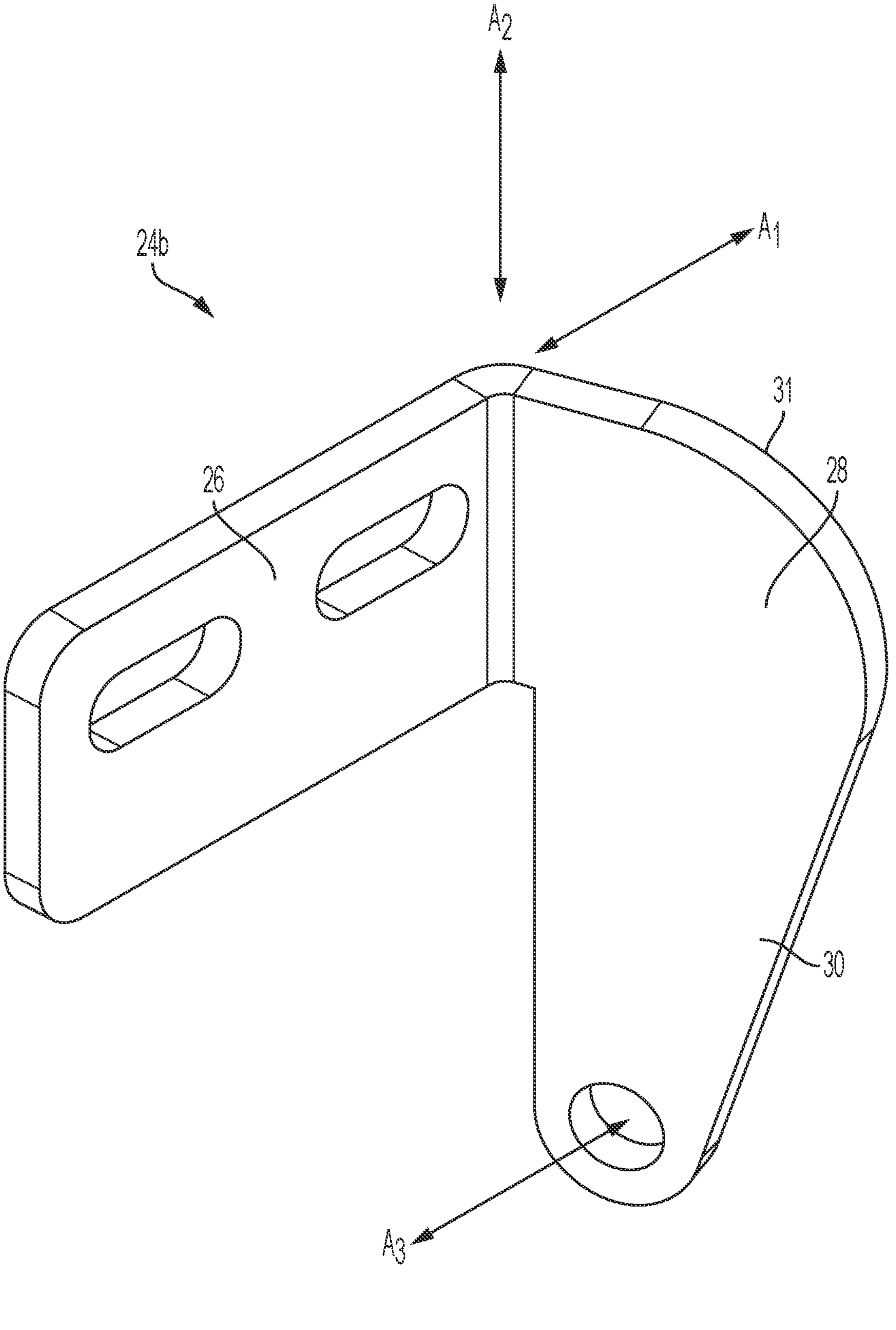
FIG. 4 is a perspective view of a right upper rear bracket of the plurality of brackets of FIG. 1, according to one aspect. A left upper rear bracket can be a mirror image of the right upper rear bracket.

In one aspect, the proximal flange portion 26 of the left and right upper rear brackets 24*a, b* can be substantially flat or substantially planar along a first longitudinal axis $A_1$, as shown in FIG. 4. The central portion 28 and the distal end portion 30 of the left and right upper rear brackets 24*a, b* can be substantially flat or substantially planar along a second longitudinal axis $A_2$. The first longitudinal axis $A_1$ can be substantially normal to the second longitudinal axis $A_2$. Optionally, the first longitudinal axis $A_1$ can be at an acute angle relative to the second longitudinal axis $A_2$.

Referring again to FIGS. 1 and 8, the left and right upper rear brackets 24*a, b* can be coupled to the lower edge 22 of the first object 14 with bolts, screws, adhesives and the like. Optionally, the left and right upper rear brackets 24*a, b* can be coupled to the lower edge 22 of the first object 14 with an upper clamping band 32 that can be mounted to the first object 14 on the outside around the lower edge 22 of the first object 14. The upper clamping band 32 can be securedly coupled to the first object 14 with bolts 34, screws, adhesives and the like. The left and right upper rear brackets 24*a, b* can be coupled to the upper clamping band 32 with bolts, screws and the like that can extend through the flange portion 26 into the upper clamping band 32. For example and as shown in FIG. 1, the upper clamping band 32 can be securedly coupled to the first object 14, and the left and right upper rear brackets 24*a, b* can be coupled to the upper clamping band 32 with nuts and bolts 36.

The left and right upper rear brackets 24*a, b* can be spaced from each other along the rear side of the first object 14 a predetermined upper distance, measured from an inner surface 31 of the distal end 30 of the left upper rear bracket 24*a* to the inner surface 31 of the distal end 30 of the right upper rear bracket 24*b*. In one aspect, the left and right upper rear brackets 24*a, b* can be spaced from each other along the rear side of the first object 14 such that a distance from each of the left and right upper rear bracket 24*a, b* to the exact rear point 15 of the first object 14 is substantially equal. In another aspect, the left and right upper rear brackets 24*a, b* can be spaced from each other along the rear side of the first object 14 such that a distance from left upper rear bracket 24*a* to the exact rear point 15 of the first object 14 is greater than the distance from the right upper rear bracket 24*b* to the exact rear point 15. Alternatively, the left and right upper rear brackets 24*a, b* can be spaced from each other along the rear side of the first object 14 such that a distance from left upper rear bracket 24*a* to the exact rear point 15 of the first object 14 is less than the distance from the right upper rear bracket 24*b* to the exact rear point 15.

The predetermined upper distance and/or the distance from each of the left and right upper rear brackets 24*a, b* to the exact rear point 15 can be selected for convenience to provide desired stability to the first object 14 as the first object 14 is being rotated about and between an open and closed position. For example, the predetermined upper distance can be greater for a larger first object 14 having a larger size than a smaller first object 14. In one aspect, the predetermined upper distance can be about one inch, about 2 inches, about 3 inches, about 4 inches, about 5 inches, about 6 inches, about 7 inches, about 8 inches, about 9 inches, about 10 inches, about 11 inches, about 12 inches and greater than about 12 inches.

In one aspect, the left and right upper rear brackets 24*a, b* can comprise a pin 38 coupled to or formed integrally with the distal end 30 of the left and right upper rear brackets 24*a, b*. In this aspect, the pin 38 can be securedly attached to the distal end 30 of each of the left and right upper rear brackets 24*a, b* and can extend away from the bracket 24*a,b* to which it is coupled and toward the other the left and right upper rear brackets 24*a, b*. For example, the pin 38 attached to the left upper rear bracket 24*a* can extend away from the left upper rear bracket 24*a* and towards the right upper rear bracket 24*b*. Similarly, the pin 38 attached to the right upper rear bracket 24*b* can extend away from the right upper rear bracket 24*b* and towards the left upper rear bracket 24*a*.

In one aspect, the pin 38 can be an elongate, rigid pin extending along a third longitudinal axis $A_3$, as shown in FIG. 4. The third longitudinal axis $A_3$ can be substantially parallel to the first longitudinal axis $A_1$. Optionally, the third longitudinal axis $A_3$ can be at an acute angle relative to the first longitudinal axis $A_1$. The third longitudinal axis $A_3$ can be substantially normal to the second longitudinal axis $A_2$. Optionally, the third longitudinal axis $A_3$ can be at an acute angle relative to the second longitudinal axis $A_2$.

In another aspect, the left and right upper rear brackets 24*a, b* can further comprise a sleeve 40 configured to be positioned over at least a portion of the pin 38. The sleeve 40 can be formed from a material having a relatively low coefficient of friction, such as a polymeric material like nylon and the like.

The plurality of brackets can further comprise left and right lower rear brackets 42*a, b* coupled to the upper edge 18 of the second object 16 on the outside and at the rear of the second object 16. The left and right lower rear brackets 42*a,b* can each have a proximal flange portion 44, a central portion 46 that extends rearward and downward from the second object 16 to a distal end portion 48. The distal end 48 of the left and right lower rear brackets 42*a, b* can extend below the upper edge 18 of the second object 16.

Figure 5:
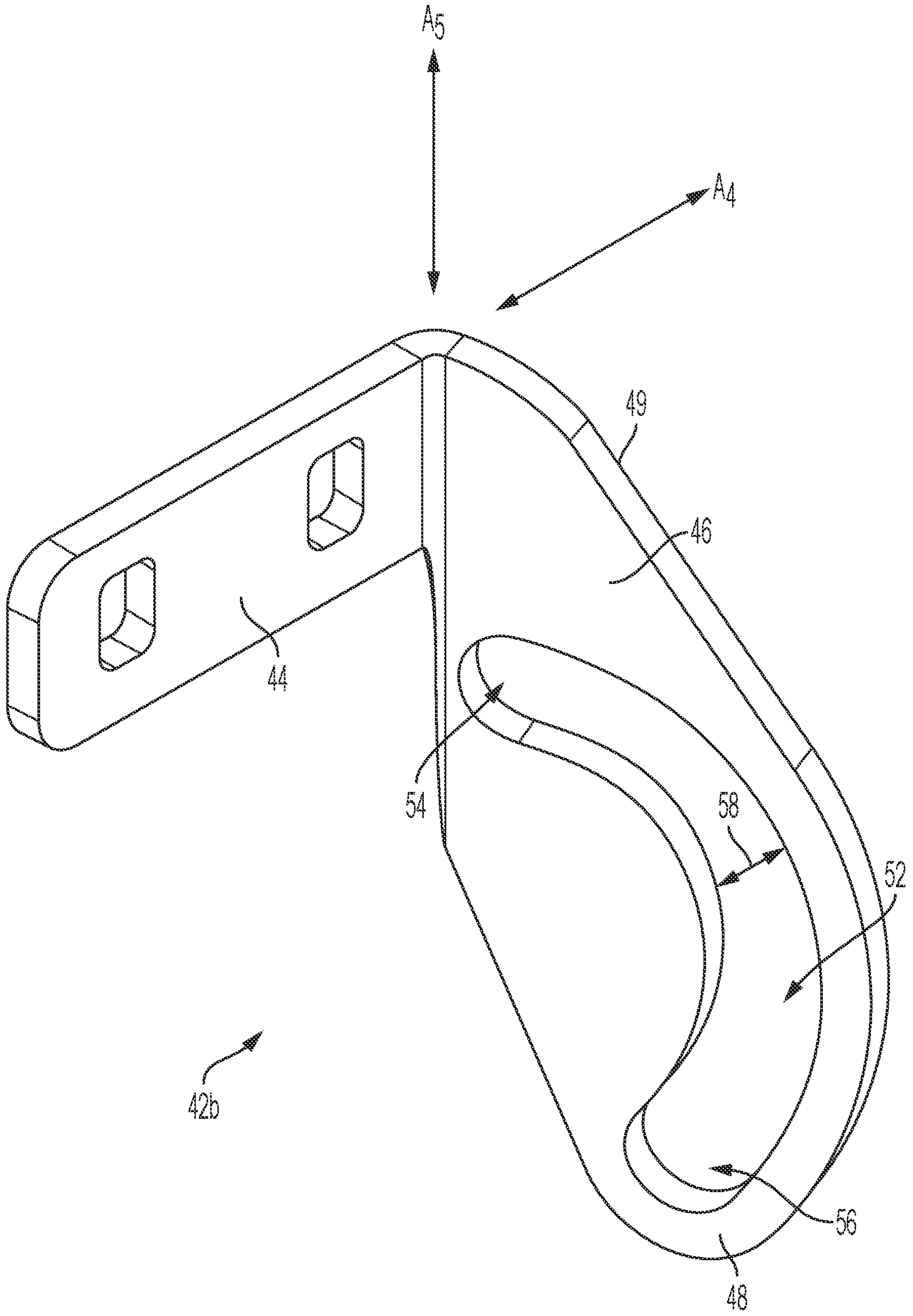
FIG. 5 is a perspective view of a right lower rear bracket of the plurality of brackets of FIG. 1, according to one aspect. A left lower rear bracket can be a mirror image of the right lower rear bracket.
Figure 6:
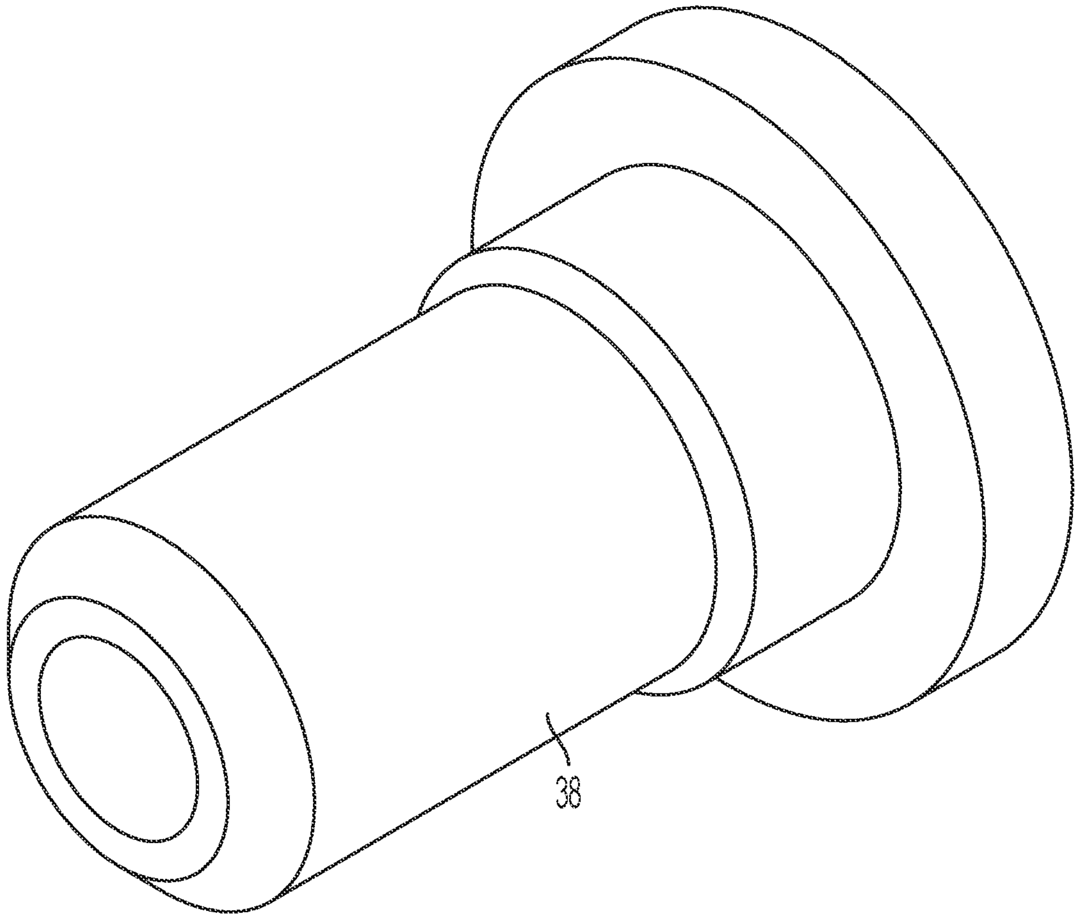
FIG. 6 is a perspective view of a pin of hinge of FIG. 1, according to one aspect.
Figure 7:
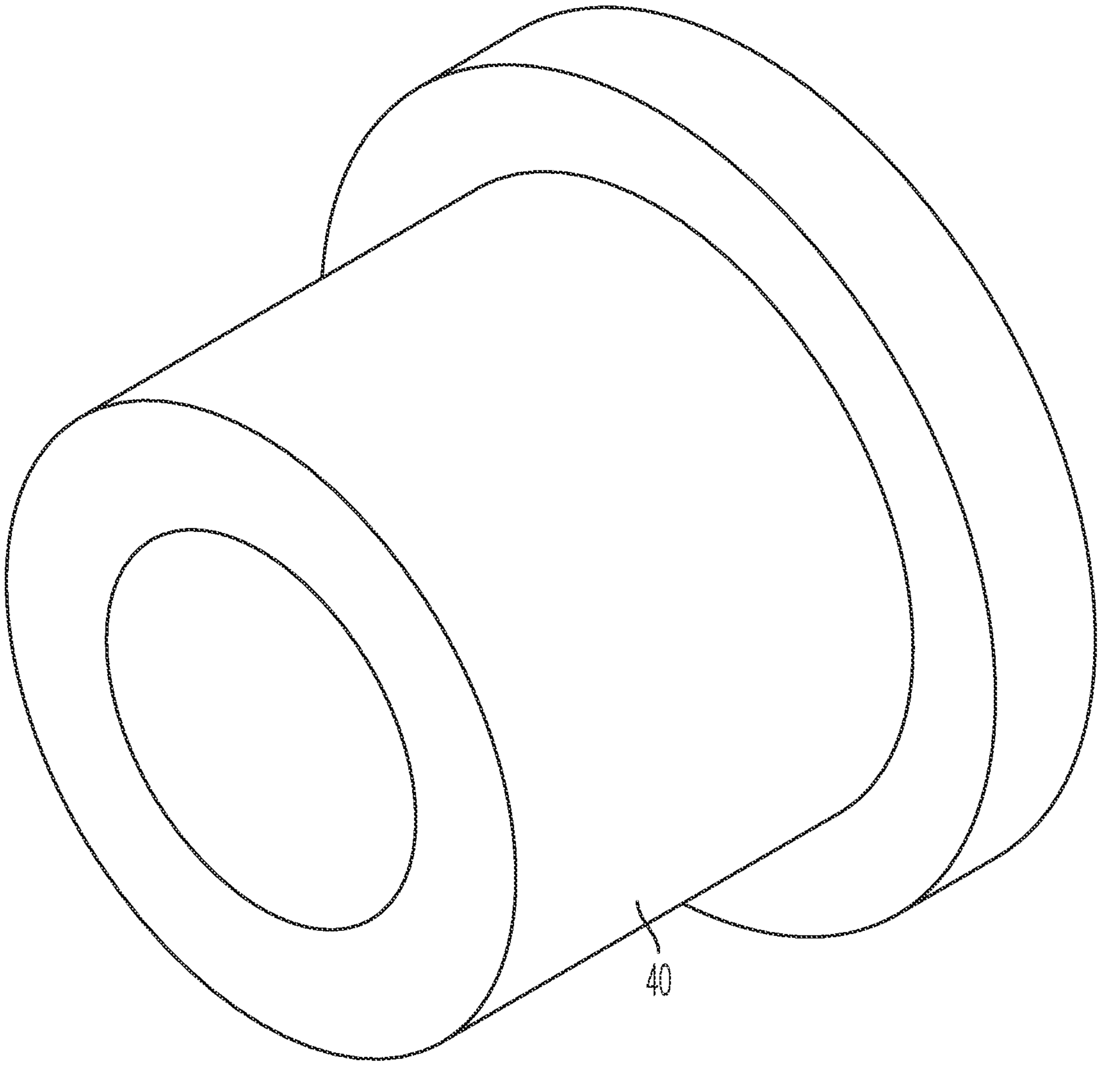
FIG. 7 is a perspective view of a sleeve for the pin of FIG. 6, according to one aspect.

In one aspect, the proximal flange portion 44 of the left and right lower rear brackets 42*a, b* can be substantially flat or substantially planar along a fourth longitudinal axis $A_4$, as shown in FIG. 5. The central portion 46 and the distal end portion 48 of the left and right lower rear brackets 42*a, b* can be substantially flat or substantially planar along a fifth longitudinal axis $A_5$. The fourth longitudinal axis $A_4$ can be substantially normal to the fifth longitudinal axis $A_5$. Optionally, the fourth longitudinal axis $A_4$ can be at an acute angle relative to the fifth longitudinal axis $A_5$.

Referring again to FIGS. 1 and 8, the left and right lower rear brackets 42*a, b* can be coupled to the upper edge 18 of the second object 16 with bolts, screws, adhesives and the like. Optionally, the left and right lower rear brackets 42*a, b* can be coupled to the upper edge 18 of the second object 16 with a lower clamping band 50 that can be mounted to the second object 16 on the outside around the upper edge 18 of the second object 16. The lower clamping band 50 can be securedly coupled to the second object 16 with bolts 34, screws, adhesives and the like. The left and right upper rear brackets 24*a, b* can be coupled to the upper clamping band 32 with bolts, screws and the like that can extend through the flange portion 44 of the left and right lower rear brackets 42*a, b* and into the lower clamping band 50. For example, the lower clamping band 50 can be securedly coupled to the second object 16, and the left and right lower rear brackets 42*a, b* can be coupled to the lower clamping band 50 with nuts and bolts 36.

A slot 52 can be defined in a portion of the left and right lower rear brackets 42*a, b*. In one aspect, the slot 52 can be an arcuate slot extending from the central portion 46 to the distal end portion 48 of the left and right lower rear brackets 42*a, b*. That is, the slot 52 can have a first slot end 54 defined in, near or adjacent to the central portion 46, and a second slot end 56 defined in, near or adjacent to the distal end portion 48 of the left and right lower rear brackets 42*a, b*. The slot 52 can have a slot width 58 sized and shaped so that the pin 38 of the left and right lower upper brackets 24*a, b* can slide therein. Optionally, the slot width 58 can be sized and shaped so that the pin 38 and the sleeve 40 of the left and right lower upper brackets 24*a, b* can slide therein. In one aspect, the slot width 58 can be constant along the length of the slot 52. Alternatively, the slot width 58 of the first slot end 54 can be less than or greater than the slot width 58 of the second slot end 56.

The left and right lower rear brackets 42*a, b* can be spaced from each other along the rear side of the second object 16 a predetermined lower distance, measured from an inner surface 49 of the distal end portion 48 of the left lower rear bracket 42*a* to the inner surface 49 of the distal end portion 48 of the right lower rear bracket 42*b*. In one aspect, the left and right lower rear brackets 42*a, b* can be spaced from each other along the rear side of the second object 16 such that a distance from each of the left and right lower rear brackets 42*a, b* to the exact rear point 17 of the second object 16 is substantially equal. In another aspect, the left and right lower rear brackets 42*a, b* can be spaced from each other along the rear side of the second object 16 such that a distance from left lower rear bracket 42*a* to the exact rear point 17 of the second object 16 is greater than the distance from the right lower rear bracket 42*b* to the exact rear point 17. Alternatively, the left and right lower rear brackets 42*a, b* can be spaced from each other along the rear side of the second object 16 such that a distance from left lower rear bracket 42*a* to the exact rear point 17 of the second object 16 is less than the distance from the right lower rear bracket 42*b* to the exact rear point 17.

The predetermined lower distance and/or the distance from each of the left and right lower brackets 42*a, b* to the exact rear point 17 of the second object 16 can be selected for convenience to provide desired stability to the first object 14 as the first object 14 is being rotated about and between an open and closed position. For example, the predetermined lower distance can be greater for a larger first object 14 having a larger size than a smaller first object 14. In one aspect, the predetermined lower distance can be about one inch, about 2 inches, about 3 inches, about 4 inches, about 5 inches, about 6 inches, about 7 inches, about 8 inches, about 9 inches, about 10 inches, about 11 inches, about 12 inches and greater than about 12 inches. In another aspect, the predetermined lower distance can be less than the predetermined upper distance. Alternatively, the predetermined lower distance can be greater than the predetermined upper distance. As will be described more fully below, the predetermined lower distance can be selected so that in use, at least a portion of the pin 38 of the left and right upper brackets 24*a, b* is positioned in the slot 52 of the corresponding left and right lower brackets 42*a, b*.

Figure 9:
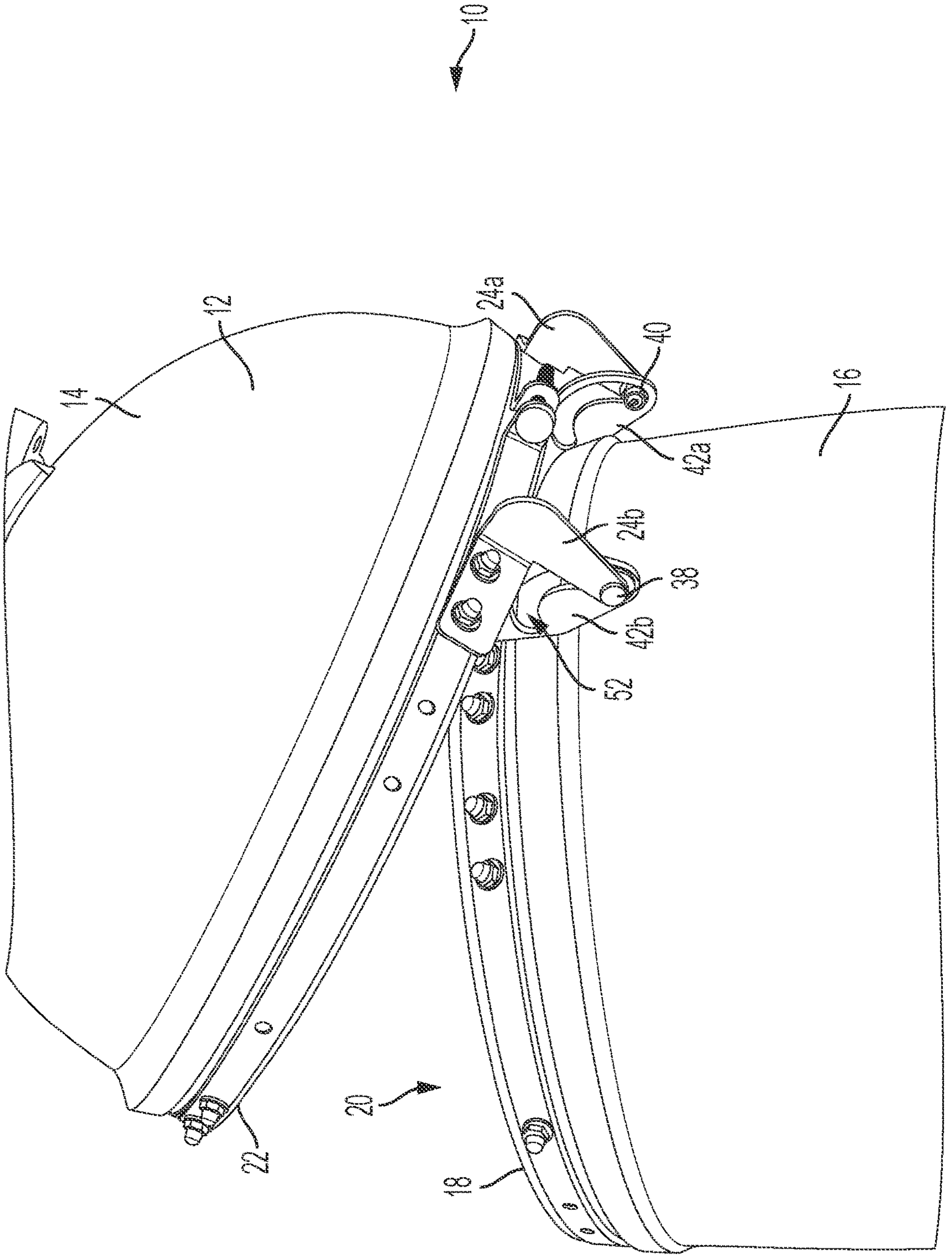
FIG. 9 is a side perspective view of the hinge of FIG. 8, showing the first object in an open position.

While the hinge device 10 can operate effectively with only the left and right upper brackets 24*a, b* engaging the corresponding left and right lower brackets 42*a, b*, as shown in FIGS. 8 and 9, it is contemplated that there can be applications in which additional support for the first object can be desired. For these applications, the plurality of brackets further comprises left and right upper front brackets 60*a, b* coupled to the lower edge 22 of the first object 14 on the outside and at the left and right sides of the first object 14, and left and right lower front brackets 64*a, b* coupled to the upper edge 18 of the second object 16 on the outside and at the left and right sides of the second object 16.

Figure 2:
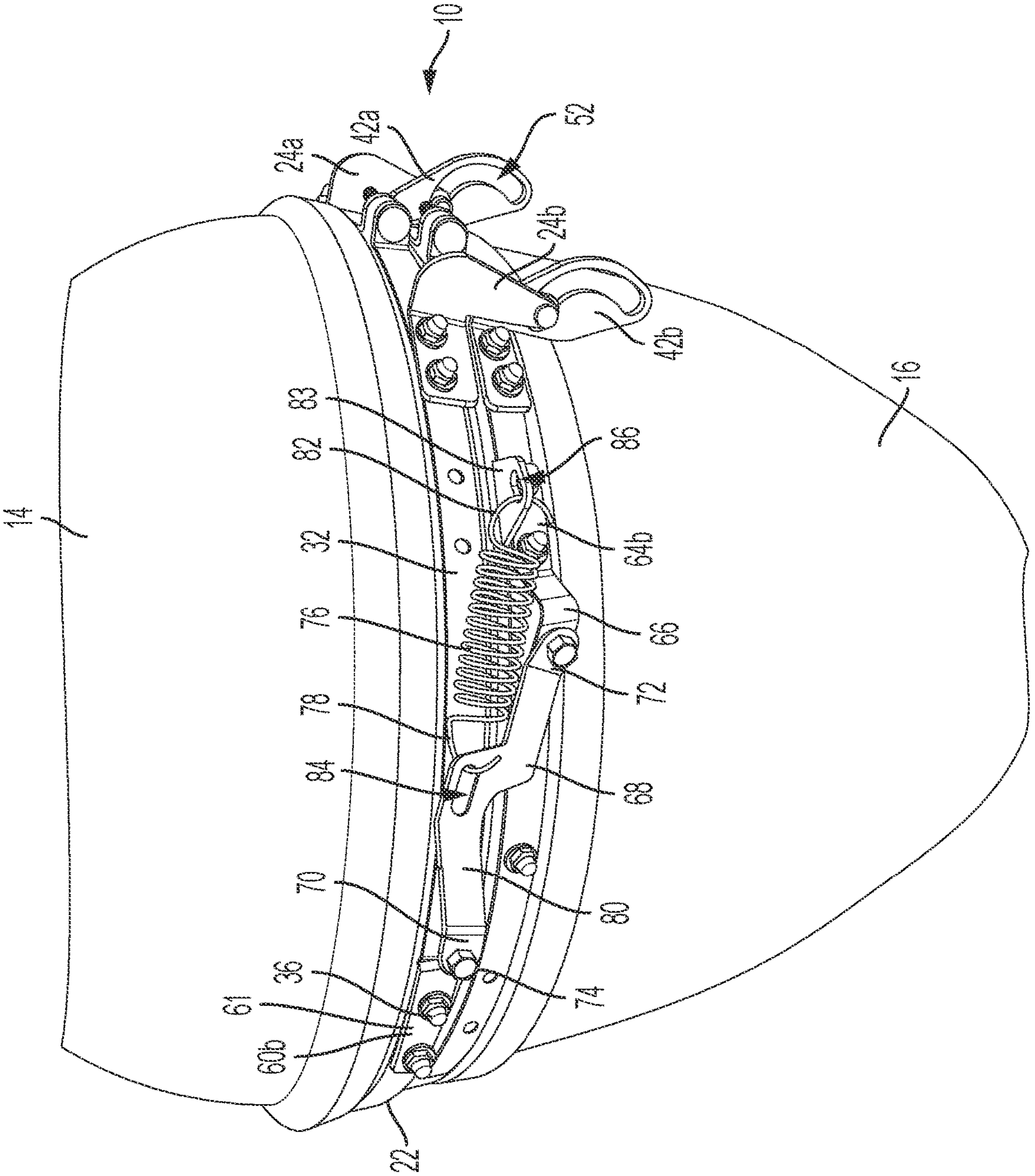
FIG. 2 is a side perspective view of the hinge of FIG. 1, showing the first object in a closed position.
Figure 3:
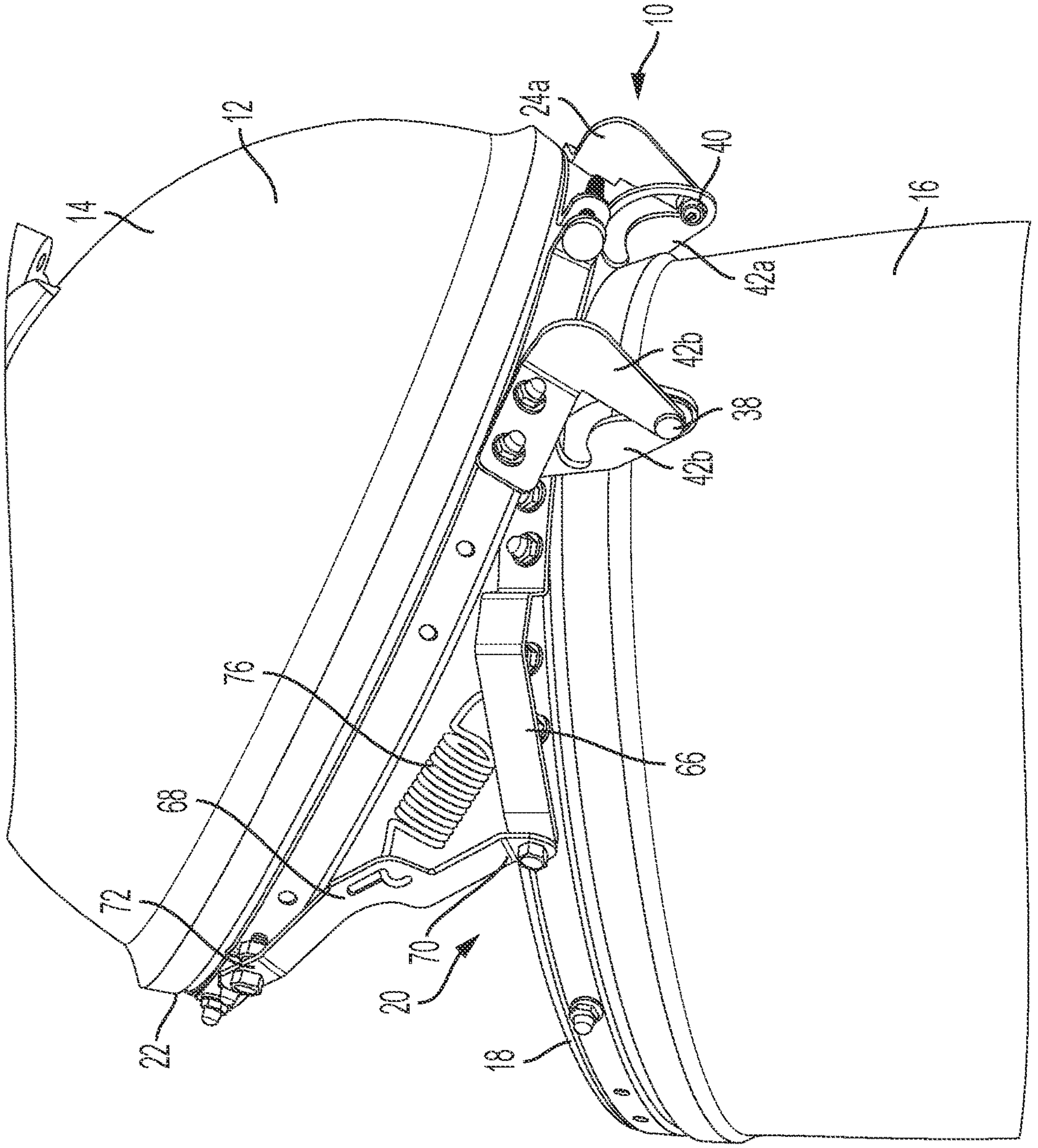
FIG. 3 is a side perspective view of the hinge of FIG. 1, showing the first object in an open position.
Figure 10:
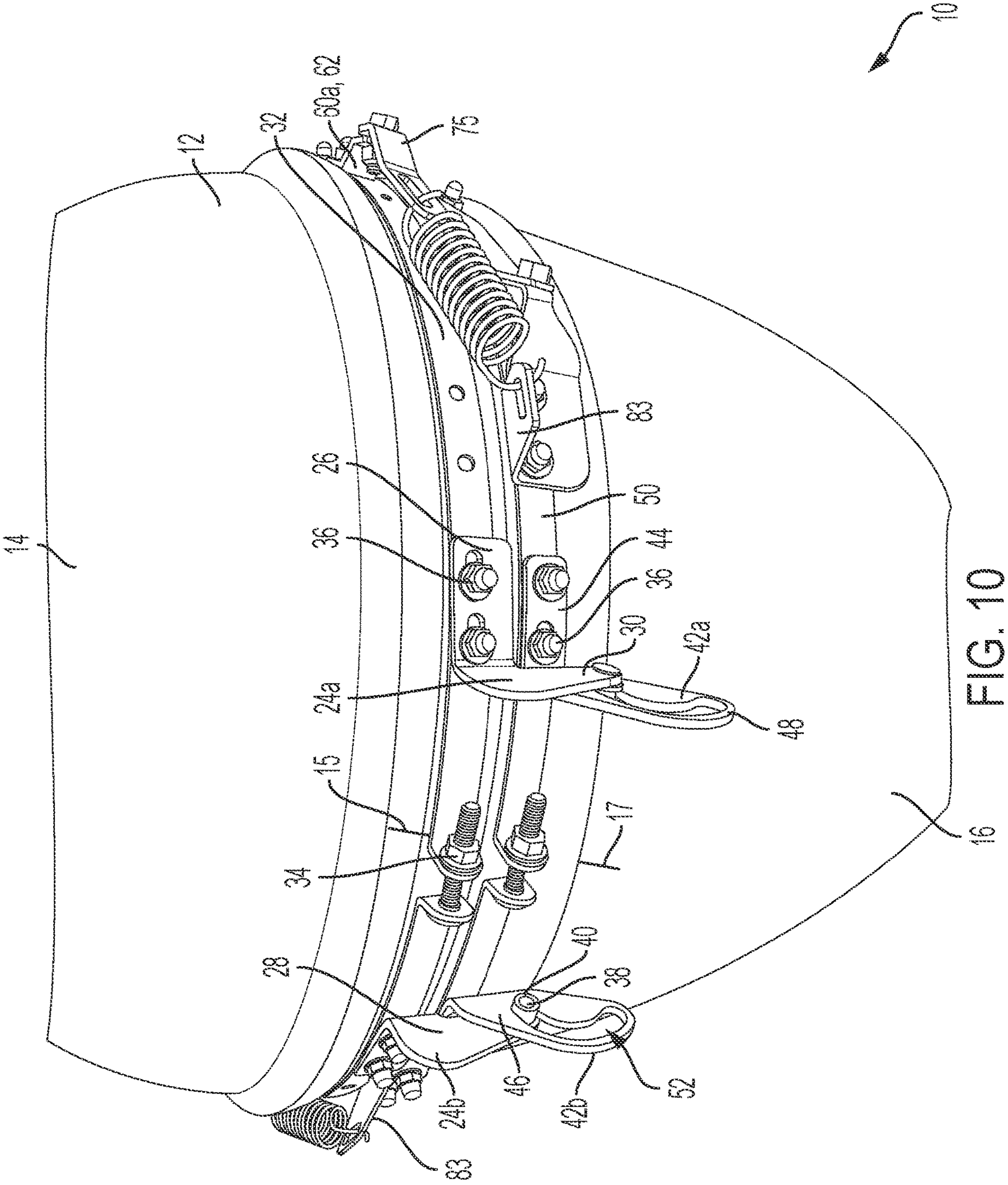
FIG. 10 is a rear perspective view of a hinge for rotating a first object relative to a fixed second object record, according to another aspect.
Figure 11:
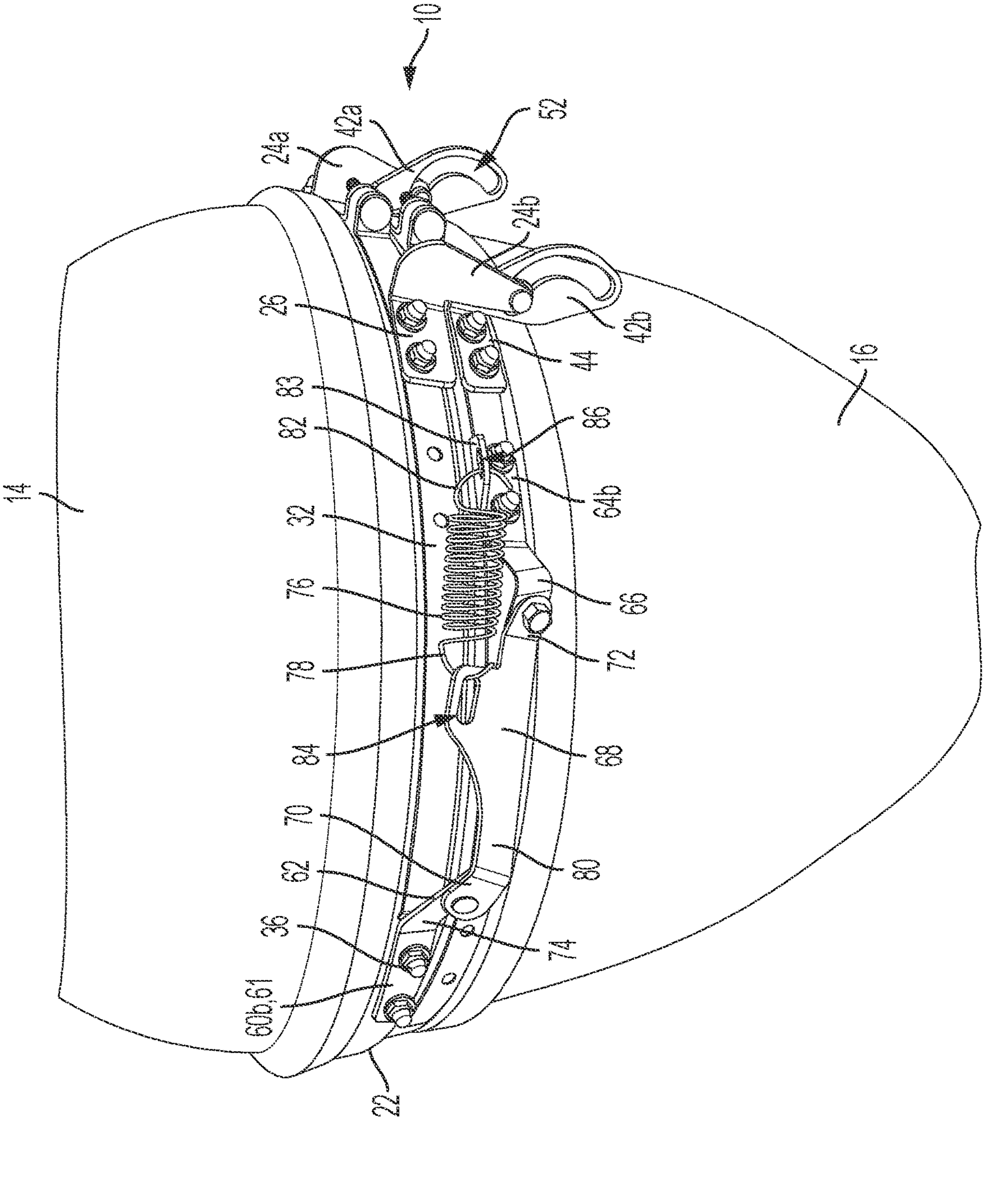
FIG. 11 is a side perspective view of the hinge of FIG. 10, showing the first object in a closed position.
Figure 12:
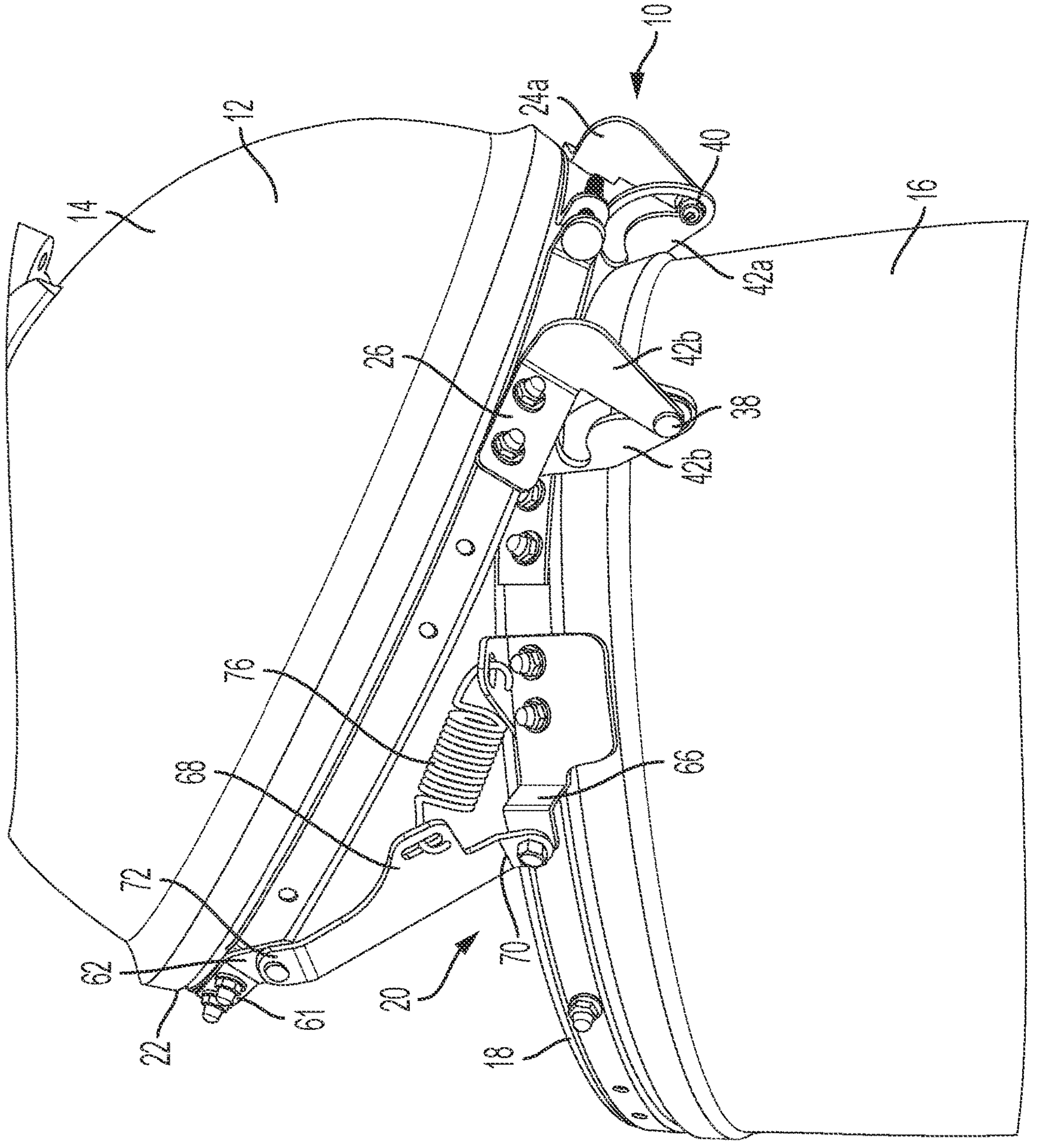
FIG. 12 is a side perspective view of the hinge of FIG. 10, showing the first object in an open position.

In one aspect and with reference to FIGS. 1-3, the left and right upper front brackets 60*a, b* comprise a flange portion 61 and an extension portion 62 extending from the flange portion 61. At least one of the flange portion 61 and the extension portion 62 can be aligned substantially parallel to the flange portion 26 of the left and right upper rear brackets 24*a, b* and/or substantially parallel to the flange portion 44 of the left and right lower rear brackets 42*a, b*. Alternatively, in another aspect as shown in FIGS. 10-12, the extension portion 62 can be at an acute angle relative to the flange portion 61 of the left and right upper front brackets 60*a, b*, the flange portion 26 of the left and right upper rear brackets 24*a, b* and/or the flange portion 44 of the left and right lower rear brackets 42*a, b*. In this aspect, at least a portion of the extension portion 62 can extend downward and away from the flange portion 61 of the left and right upper front brackets 60*a, b*. For example, when assembled as described more fully below, and when the first object 14 is in the first closed position, at least a portion of the extension portion 62 can be positioned adjacent to the second object 16 and/or below the lower edge 22 of the first object 14.

With reference to FIG. 2, the left and right upper front brackets 60*a, b* can be coupled to the lower edge 22 of the first object 14 with bolts, screws, adhesives and the like. Optionally, the left and right upper front brackets 60*a, b* can be coupled to the lower edge 22 of the first object 14 with the upper clamping band 32. That is, the left and right upper front brackets 60*a, b* can be coupled to the upper clamping band 32 with bolts, screws and the like that can extend through a portion of the left and right upper front brackets 60*a, b* and into the upper clamping band 32. For example, the upper clamping band 32 can be securedly coupled to the first object 14, and the left and right upper front brackets 60*a, b* can be coupled to the upper clamping band 32 with nuts and bolts 36.

Moreover, the left and right lower front brackets 64*a, b* can be coupled to the upper edge 18 of the second object 16 between the left and right upper front brackets 60*a, b* and the left and right upper rear brackets 24*a, b*. That is, the left lower front bracket 64*a* can be coupled to the upper edge 18 of the second object 16 between the left upper front bracket 60*a* and the left upper rear bracket 24*a*. Similarly, the right lower front bracket 64*b* can be coupled to the upper edge 18 of the second object 16 between the right upper front bracket 60*b* and the right upper rear bracket 24*b*. The left and right lower front brackets 64*a, b* comprise an extension portion 66 aligned substantially parallel to the flange portion 26 of the left and right upper rear brackets 24*a, b* and substantially parallel to the flange portion 44 of the left and right lower rear brackets 42*a, b*.

The hinge device 10 further comprises a linkage bar 68 that pivotally couples the left and right upper front brackets 60*a, b* with the corresponding left and right lower front brackets 64*a, b*. For example, a first end 70 of the linkage bar 68 can be pivotally connected to the extension portion 62 of the left and right upper front brackets 60*a, b*, and a second end 72 of the linkage bar 68 can be pivotally connected to the extension portion 66 of the left and right lower front brackets 64*a, b*. The linkage bar 68 can be pivotally coupled to the left and right upper front brackets 60*a, b* and to the left and right lower front brackets 64*a, b* by use of appropriate fasteners 74 that extend through attachment holes defined in the first end 70 and the second end 72 of the linkage bar 68. In one aspect, the first end 70 and the second end 72 of the linkage bar 68 can be parallel to each other but offset from each other by a central linkage bar portion 75 of the linkage bar 68 that is at an obtuse angle relative to the first end 70 and the second end 72 of the linkage bar 68.

In one aspect, the hinge device 10 can further comprise at least one biasing element 76 such as a compression spring, an extension spring, a torsion soring, a leaf spring, a coil spring, a hydraulic spring and the like. In this aspect, the biasing element 76 can be configured to reduce the force required by the user to lift the first object 14, and/or smooth the movement of the first object 14 as it moves about and between the first closed position and the second open position, described more fully below.

As shown in FIG. 2, the biasing element 76 can have a first end 78 coupled to a mounting portion 80 of the linkage bar 68 and a second end 82 coupled to a tab portion 83 of one of the left and right lower front brackets 64*a, b*. In one aspect, the tab portion 83 can extend substantially perpendicularly away from the left and right lower front brackets 64*a, b*. Alternatively, and as shown in FIGS. 10-12, the tab portion 83 can extend upwardly and away from the left and right lower front brackets 64*a, b* at an acute angle. For example, when assembled as described more fully below, and when the first object 14 is in the first closed position, at least a portion of the tab portion 83 can be positioned above the upper edge 18 of the second object 16. In one aspect, the biasing element 76 can be positioned substantially parallel to the linkage bar 68 when the first object 14 is in the first closed position.

In one aspect, the first end 78 of the biasing element 76 can be coupled to a bore 84 defined in the linkage bar 68. Alternatively, a bar bracket, a bar notch or any other attachment point (not shown) can be provided for attachment of the biasing element 76 to the linkage bar 68. Similarly, the second end 82 of the biasing element 76 can be coupled to a bore 86 defined in the left and right lower front brackets 64*a, b*. Alternatively, an attachment bracket, an attachment notch or any other attachment point (not shown) can be provided for attachment of the biasing element 76 to the left and right lower front brackets 64*a, b*. The at least one biasing element 76 can comprise a single biasing element positioned on either the left side or the right side of the first object 14. Alternatively, the at least one biasing element 76 can comprise two biasing elements, with one biasing element 76 positioned on the left side and another biasing element 76 positioned on the right side of the first object 14. Optionally, the at least one biasing element 76 can comprise more than two biasing elements 76.

Any of the brackets, linkages, pins, biasing elements and other hardware described herein can be formed from any appropriate durable structural material using any fabrication process. For example, stainless steel or another appropriate metal can be used. In another example, a rigid polymeric material such as nylon and the like can be used. The materials can be cut, bent, welded, molded, or otherwise formed in a conventional manner to form the components of the hinge device 10.

To assemble the hinge device 10, the left and right upper rear brackets 24*a, b* can be coupled to the lower edge 22 of the first object 14 on the outside and at the rear of the first object 14. The left and right lower rear brackets 42*a, b* can be coupled to the upper edge 18 of the second object 16 on the outside and at the rear of the second object 16 such that the pin 38 of the left and right upper rear brackets 24*a, b* is positioned in the slot 52 of the corresponding left and right lower rear brackets 42*a, b*. Optionally, if front brackets are to be used, the left and right upper front brackets 60*a, b* can be coupled to the lower edge 22 of the first object 14 on the outside and at the left and right sides of the first object 14. The left and right lower front brackets 64*a, b* can be coupled to the upper edge 18 of the second object 16 on the outside and at the left and right sides of the second object 16. Each of the left and right upper front brackets 60*a, b* can be pivotally connected to a corresponding left and right lower front brackets 64*a, b* with a linkage bar 68.

In use, the hinge device 10 allows the first object 14 to rotate relative to the fixed second object 16. In one aspect, the first object 14 can rotate about and between the first closed position (as shown in FIGS. 1 and 2), in which the lower edge 22 of the first object 14 engages the upper edge 18 of the second object 16, and the second open position (as shown in FIG. 3), in which the front of the first object 14 is spaced from the second object 16 a predetermined open distance. For example, if the first object 14 is a lid of a grill 12, the predetermined open distance can be large enough to allow a user to easily access the interior chamber 20 of the grill 12. If a sealing gasket is present, in the first closed position, the gasket can engage the lower edge 22 of the first object 14 and the upper edge 18 of the second object 16 to form a scale.

In order to move the first object 14 from the first closed position to the second open position, a user can grasp and handle or other opening device positioned on the front side of the first object 14. The user can then lift the handle upwards away from the second object 16. The linkage bar 68 begins to lift the rear portion of the first object 14 upward and rearward as the linkage bar 68 rotates. As the pin 38 of the left and right upper rear brackets 24*a,b* slides downward along the arcuate slot 52, at first the walls of the slot 52 urge the rear of the first object 14 rearward and downward. Simultaneously, the linkage bar 68 is rotated upward, urging the front of the first object 14 upward and rearward. As can be seen, the upper rear brackets 24*a, b* are not pivotally connected to the lower rear brackets 42*a, b* and the upper rear brackets 24*a, b* do not pivot about the lower rear brackets 42*a, b*. Instead, the upper rear brackets 24*a, b* rotate relative to the lower rear brackets 42*a, b* such that the slot 52 guides and/or provides rotational limits to the first object 14. If a biasing element 76 is included, the biasing element can assist the user in urging the first object 14 upward and rearward.

As the linkage bar 68 rotates past a substantially vertical position, gravity can begin to assist in rotating the first object 14 to the open position. As the first object 14 continues to rotate and the pin 38 travels further along the slot 52, the curvature of the slot then causes the rear of the first object 14 to be urged forward and downward. Simultaneously, the linkage bar 68 guides the front of the first object 14 rearward and downward. The opposing action rapidly increases the opening angle of the first object 14 relative to the second object 16. The first object 14 can continue to rotate in this manner until the pin 38 of the left and right upper rear brackets 24*a,b* contacts the second end 56 of the arcuate slot 52, thereby preventing further opening rotation. In the second open position, the first object 14 can be held open safely by its own weight bearing on pin 38 that in engaged with the second end 56 of the slot 52.

In order to move the first object 14 from the second open position to the first closed position, the user can grab the handle and apply downward pressure, upon which the above opening process is reversed.

Although several aspects of the invention have been disclosed in the foregoing specification, it is understood by those skilled in the art that many modifications and other aspects of the invention will come to mind to which the invention pertains, having the benefit of the teaching presented in the foregoing description and associated drawings. It is thus understood that the invention is not limited to the specific aspects disclosed hereinabove, and that many modifications and other aspects are intended to be included within the scope of the appended claims. Moreover, although specific terms are employed herein, as well as in the claims that follow, they are used only in a generic and descriptive sense, and not for the purposes of limiting the described invention.

What is claimed is:

1. A hinge for rotating a first object relative to a fixed second object, wherein the first object has a lower edge configured to matingly engage an upper edge of the second object, and wherein the first object and the second object have a front side and an opposed rear side, the hinge comprising:

left and right upper rear brackets coupled to the lower edge of the first object at the rear of the first object, the left and right upper rear brackets each comprising:

a proximal upper flange portion and an opposed distal portion, the distal portion extending rearward from the first object; and a pin coupled to the distal portion;

left and right lower rear brackets coupled to the upper edge of the second object at the rear of the second object, the left and right lower rear brackets each comprising a proximal lower flange portion, an opposed distal lower portion and a central portion between the proximal lower flange portion and the distal lower portion, wherein an arcuate slot is defined in a portion of each of the left and right lower rear brackets, the slot having a first slot end defined in the central portion and a second slot end defined in the distal lower portion, and wherein the slot is sized and shaped such that at least a portion of the pin can be positioned therein and can slidingly move therethrough the slot, and wherein the first object is rotatable about and between a first closed position, in which the lower edge of the first object engages the upper edge of the second object, and a second open position, in which the front of the first object is spaced from the second object a predetermined open distance, and wherein the distal portion of the left and right upper rear brackets extends below the upper edge of the second object when the first object is in the first closed position and in the second open position.

2. The hinge of claim 1, wherein the distal lower portion of the left and right lower rear brackets extends below the upper edge of the second object.

3. The hinge of claim 1, wherein the left and right upper rear brackets are spaced from each other along the rear side of the first object such that a distance from each of the left and right upper rear brackets to the exact rear point of the first object is substantially equal.

4. The hinge of claim 1, wherein the left and right upper rear brackets are spaced from each other along the rear side of the first object a predetermined upper distance, wherein the left and right lower rear brackets are spaced from each other along the rear side of the second object a predetermined lower distance, and wherein the predetermined upper distance is greater than the predetermined lower distance.

5. The hinge of claim 1, wherein the left and right upper rear brackets further comprise a sleeve positioned over at least a portion of the pin that is positioned in the slot.

6. The hinge of claim 1, wherein in the first closed position, the pin is adjacent to the first slot end, and in the second open position, the pin is adjacent to the second slot end.

7. The hinge of claim 1, wherein the left and right upper rear brackets are coupled to the first object by an upper clamping band that is securedly attached to and extends around the first object.

8. The hinge of claim 7, wherein the left and right lower rear brackets are coupled to the second object by a lower clamping band that is securedly attached to and extends around the second object.

9. The hinge of claim 1, wherein the slot has a slot width that is constant along the length of the slot.

10. The hinge of claim 1, wherein the slot has a slot width that increases as the slot extends from the central portion to the distal lower portion.

11. The hinge of claim 1, wherein the proximal upper flange portion of the left and right upper rear brackets are substantially planar along a first longitudinal axis, and wherein the pin is an elongate pin extending along a third longitudinal axis that is substantially parallel to the first longitudinal axis.

12. The hinge of claim 1, wherein the hinge further comprises left and right upper front brackets coupled to the lower edge of the first object and at the left and right sides of the first object.

13. The hinge of claim 12, wherein the hinge further comprises left and right lower front brackets coupled to the upper edge of the second object at the left and right sides of the second object between the left and right upper front brackets and the left and right upper rear brackets.

14. The hinge of claim 13, wherein the hinge further comprises a left linkage bar that pivotally couples the left upper front bracket to the left lower front bracket, and a right linkage bar that pivotally couples the right upper front bracket to the right lower front bracket.

15. The hinge of claim 14, wherein the hinge further comprises at least one biasing element configured to reduce the force required by the user to lift the first object.

16. The hinge of claim 15, wherein the at least one biasing element comprises a left side biasing element having a first end coupled to a portion of the left linkage bar and a second end coupled to a portion of the left lower front bracket.

17. The hinge of claim 16, wherein the at least one biasing element further comprises a right side biasing element having a first end coupled to a portion of the right linkage bar and a second end coupled to a portion of the right lower front bracket.

18. The hinge of claim 1, wherein the arcuate slot is a continuously arcuate slot.

19. A method for rotating a first object relative to a fixed second object, wherein the first object has a lower edge configured to matingly engage an upper edge of the second object, and wherein the first object and the second object have a front side and an opposed rear side, the method comprising:

providing a hinge comprising:

left and right upper rear brackets coupled to the lower edge of the first object at the rear of the first object, the left and right upper rear brackets each having a proximal upper flange portion and an opposed distal portion, the distal portion extending rearward from the first object;

left and right lower rear brackets coupled to the upper edge of the second object at the rear of the second object, the left and right lower rear brackets each comprising a proximal lower flange portion, an opposed distal lower portion and a central portion between the proximal lower flange portion and the distal lower portion, wherein an arcuate slot is defined in a portion of each of the left and right lower rear brackets; and a pin coupled to the distal portion of the left and right upper rear brackets, wherein the slot is sized and shaped such that at least a portion of the pin can be positioned therein and can slidingly move therethrough the slot, and urging the first object about and between a first closed position, in which the lower edge of the first object engages the upper edge of the second object, and a second open position, in which the front of the first object is spaced from the second object a predetermined open distance.

20. The method of claim 19, wherein the hinge further comprises:

left and right upper front brackets coupled to the lower edge of the first object and at the left and right sides of the first object;

left and right lower front brackets coupled to the upper edge of the second object at the left and right sides of the second object between the left and right upper front brackets and the left and right upper rear brackets;

a left linkage bar that pivotally couples the left upper front bracket to the left lower front bracket; and a right linkage bar that pivotally couples the right upper front bracket to the right lower front bracket.

* * * * *